UNITED STATES PATENT OFFICE.

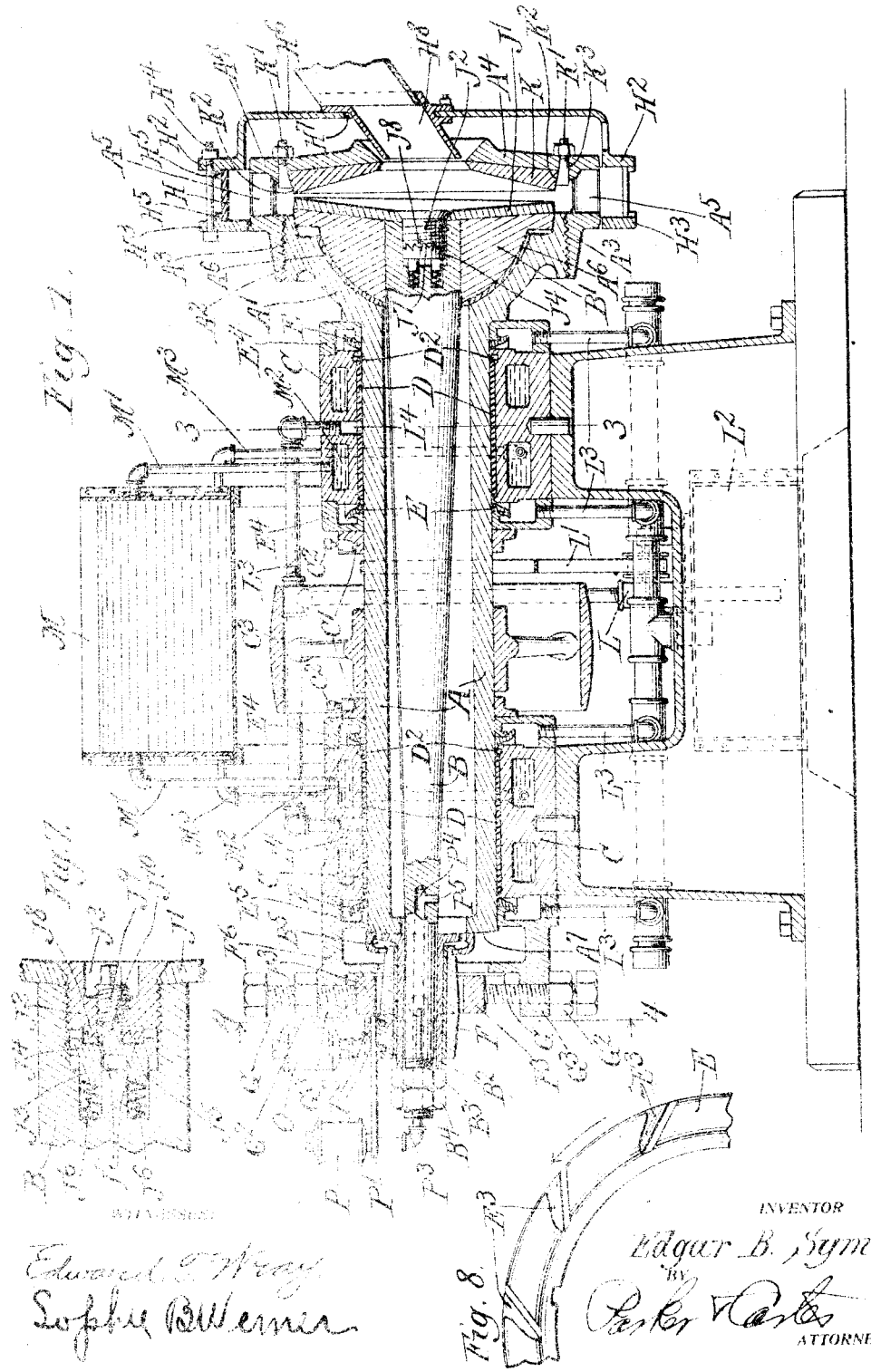

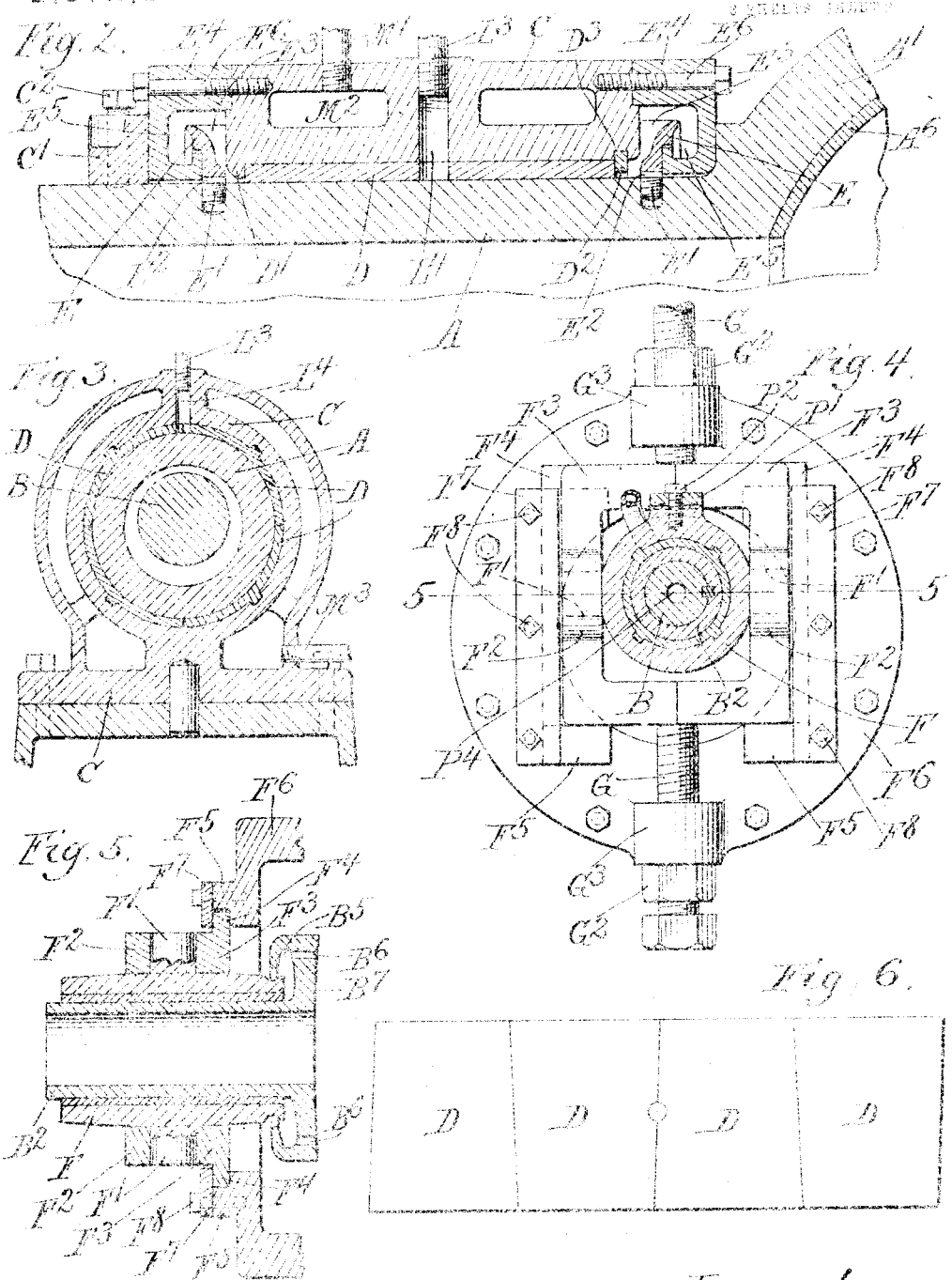

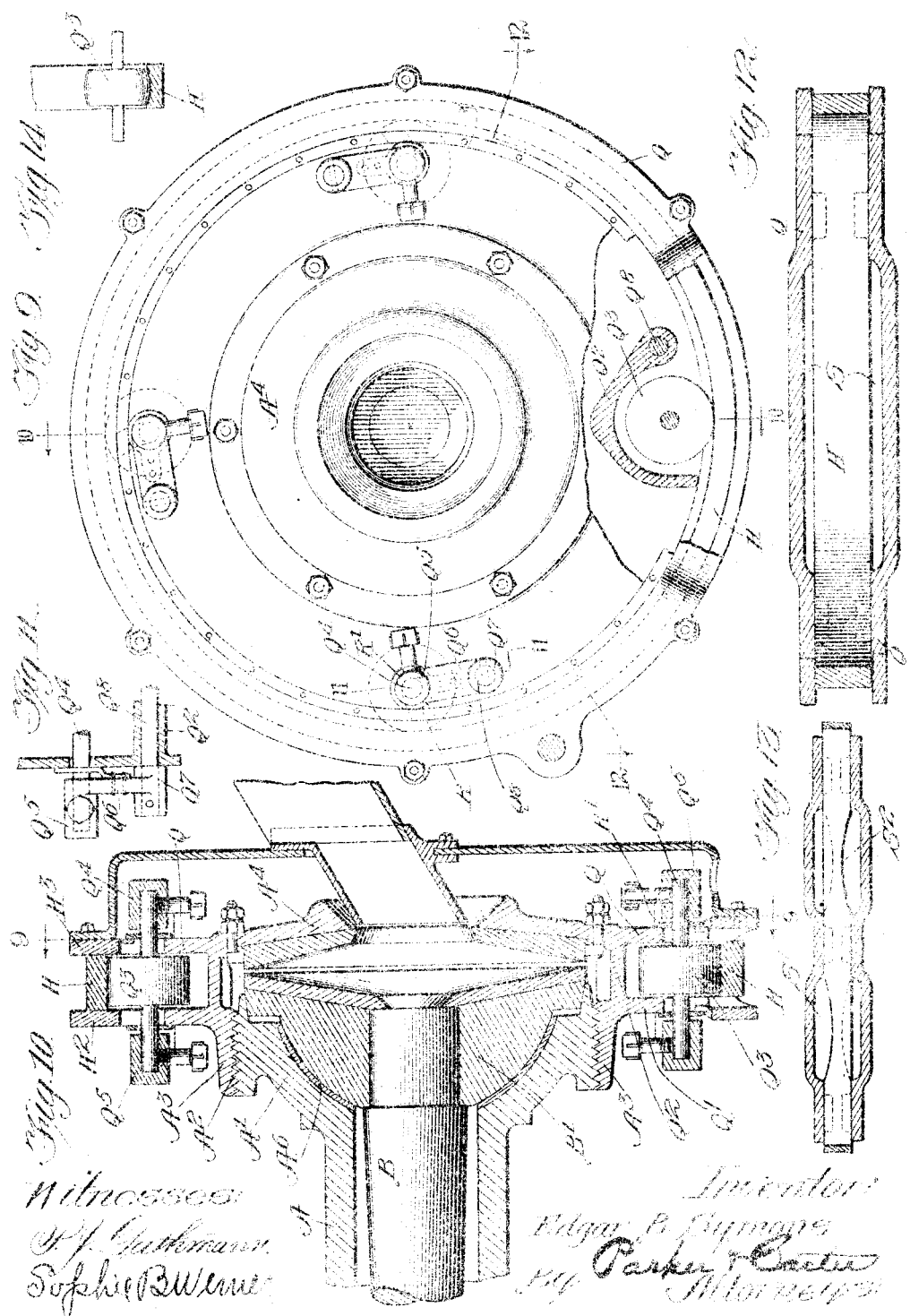

EDGAR B. SYMONS, OF MILWAUKEE, WISCONSIN.

CRUSHING-MACHINE.

1,072,193.       Specification of Letters Patent.     Patented Sept. 2, 1913.

Application filed January 26, 1910. Serial No. 540,119.

*To all whom it may concern:*

Be it known that I, EDGAR B. SYMONS, a citizen of the United States, residing at Milwaukee, in the county of Milwaukee and State of Wisconsin, have invented a certain new and useful Improvement in Crushing-Machines, of which the following is a specification.

My invention relates to crushing machines, and is illustrated in the accompanying drawings, wherein—

Figure 1 is a sectional elevation; Fig. 2, a detail section of Fig. 1; Fig. 3, a section along the line 3—3 of Fig. 1; Fig. 4, a section along the line 4—4 of Fig. 1; Fig. 5, a section along the line 5—5 of Fig. 4; Fig. 6, a development of one of the bearing surfaces; Fig. 7, a detail section; Fig. 8, a detail section; Fig. 9, an end elevation of a modification with parts removed; Fig. 10, a section along the line 10—10 of Fig. 9; Fig. 11, a section along the line 11—11 of Fig. 9; Fig. 12, a section along the line 12—12 of Fig. 9 with parts removed; Fig. 13, a section with parts removed showing a modification; Fig. 14, a section on a reduced scale showing a modified form.

Like parts are indicated by the same letter in all the figures.

The hollow shaft A has at one end the enlargement or flange $A^1$, threaded at $A^2$ to engage the collar $A^3$ which supports the plate $A^4$ by means of the connecting lugs $A^5$. The enlargement $A^1$ is provided upon the inside with the anti-friction metal lining $A^6$ having a spherical surface. The other end of the shaft A has a spherical surface $A^7$ drawn about the same center as the surface of the lining $A^6$.

The shaft B is provided at one end with the enlargement $B^1$ having a spherical surface corresponding with and adapted to engage the metal lining $A^6$ and at the other end is surrounded by the sleeve $B^2$ which bears at one end upon the spherical surface $A^7$ and at the other is contacted by the nut $B^3$ and lock nut $B^4$ upon the shaft B. The sleeve $B^2$ is provided at one end with the annular channel or groove $B^5$ having one side projecting from and overhanging the body of the sleeve together with openings leading from such groove $B^5$ to the spherical surface $B^7$ which engages the surface $A^7$.

The shaft A is carried in the sleeves C and is held against lateral displacement therein, by means of the collars $C^1$ held firmly upon the shaft by means of the set screws $C^2$, and is rotated by means of a belt not shown about the pulley $C^3$. The bearing surfaces in the sleeves C are made up of a plurality of anti-frictional metal segments D which segments have their longitudinal sides at an angle one with the other as shown in Fig. 6. These segments are inserted into the sleeve and abut at one end upon the shoulder $D^1$ and are held from longitudinal displacement at the other end by means of the spring ring $D^2$ engaging the groove $D^3$ in the body of the sleeve.

The collars E surrounding the shaft A, at either end of both the bearings in the sleeves C, are held firmly upon it by means of the screws $E^1$ provided with the key-like lugs $E^2$ which engage keyways in the collars. These collars are provided with blades $E^3$ at an angle both with the axis and the radii of the shaft when in position, as indicated in Fig. 8. The rings $E^4$ having the L-shaped channel $E^5$ therein surround the shaft A and are held against the sleeve C by means of the screws $E^6$.

The sleeve $B^2$ is carried in the bearing F mounted upon the trunnions $F^1$ in lugs $F^2$ upon the U-shaped members $F^3$. The flanges $F^4$ upon the members $F^3$ are seated upon the bosses $F^5$ upon the disk $F^6$ and are held slidably thereto by means of the plates $F^7$ and bolts $F^8$. The screws G having the lock nuts $G^2$ and engaging the screw-threaded lugs $G^3$ on the disk $F^6$ provide means for varying the position of the members $F^3$ and thereby raising or lowering the end of the shaft B.

The circular ring H held between the flanges $H^2$, $H^3$, by means of the bolts $H^4$ and contacting the lugs $H^5$ upon the flanges $H^2$, $H^3$, is located in a plane intermediate the two members $B^1$ and $A^4$. The hood $H^6$ comprising a continuation of the flange $H^2$ has at its center the opening $H^7$ and tubular chute $H^8$. The dish-shaped crushing member $J^1$ is rigidly held upon the member $B^1$ by means of the screw $J^2$ which screw may be turned by means of a wrench inserted in the square opening $J^3$, and has a locking means in connection comprising the collar $J^4$ having the lugs $J^5$ engaging a plurality of holes and springs $J^6$, in the bottoms of said holes, and teeth $J^7$ interlocking with teeth $J^8$ on the screw $J^2$ to prevent rotation of the latter. The small screw J⁹ threaded in the screw J² is adapted to contact the lug J¹⁰ and through it force the teeth J⁷ out of contact with the teeth J⁸, thus permitting the rotation of the screw J², to detach the plate J. The plate K is attached to the member A⁴ by means of the angular bolts K¹ engaging the slanting surface K² and bearing in the holes K³ in the plate A⁴. The pump L, driven by means of the belt L¹ upon the shaft A forces oil from the reservoir L² through the piping system L³ to the opening L⁴ in the bearing sleeves C. The oil works out along the shaft in both directions to the collar E where it is caught up by the vanes upon the collar and thrown outward into the opening E⁵ from which it passes back through the piping L⁵ to the reservoir. The tank M is connected at its top by means of the pipe M¹ with the top of the chamber M² in the bearing sleeves C, and at its bottom by the pipe M³ with the bottom of the chamber about the bearing sleeves C. This provides a water cooling means wherein the circulation is responsive to the heat of the water alone. The oil cup O in the bearing F provides oil for that bearing, which oil runs through to and out into the channel B⁵, collecting there until centrifugal force exercises sufficient pressure to force it through the openings B⁶ to lubricate the bearing surface B⁷. The oil cup P is supported by means of the rod P¹ and bolts P² upon the stationary bearing F and is connected by means of the piping P³ and the passages P⁴ and P⁵ in the shaft to the interior of the shaft A. From there the oil is carried by the rotation of the shaft to the surface of the bearing metal A⁶ where its acts as lubricant for the ball and socket joint connecting the shafts A and B.

In the modification illustrated in Figs. 9 to 14 inclusive plate A⁴ and collar A⁵ are provided with the flanges Q, Q¹ which are connected by means of the members Q². The rollers Q³ which travel upon the ring H are located between said flanges and partly within or protected by the members Q³ and mounted upon the shafts Q⁴. The bearings Q⁵ which support the shafts Q⁴ are connected by means of the arms Q⁶ with the bearings Q⁷ which are rigidly fixed upon the shafts Q⁸. The slots R in the periphery of the flanges Q, Q¹, which permit the rolls to radially change their position responsive to the material being crushed, are covered at all times by means of the annular rings R¹, which slide upon the flanges Q, Q¹. The flanges H², H³ which support the ring H are provided at either side with the openings S. The modification in Fig. 13 shows the ring provided with the recesses S¹, S² on alternating sides. The modification in Fig. 13 shows the ring H having a curved cross section, the rollers being provided with a surface to correspond.

The use and operation of my invention are as follows: My machine has two opposed dish-shaped crushing surfaces rotating equally in the same direction at an angle with each other, and the material is fed into the central space between them and carried by centrifugal force outwardly toward their more nearly approaching surfaces. Since these surfaces are at an angle with each other, they approach and recede during their rotation, crushing the material as they approach each other, and allowing it to travel farther out as they recede from one another, until it is fine enough to be thrown out by centrifugal force from between the crushing members. These members are mounted each upon a shaft supported one within the other by a ball and socket joint. The exterior shaft is mounted in any suitable bearings and a free circulation of lubricating oil is provided by using sleeve bearings, allowing escape of oil only at the ends and by protecting the ends of the bearing by grooved sleeves about collars rotating with the shaft. The oil is forced into the bearings by any suitable means, passes out and is caught up upon vanes of the rotating collars and thrown into the grooves in the stationary sleeve passing back to the reservoir. The water cooling system consists of a tank with connections leading thence to water cooling chambers within the bearings, pipes and return pipes so that as the water heats it circulates and rises to the tank. To overcome the tendency of the two shafts to move with reference to each other longitudinally and thus unseat their ball and socket bearing, the inner shaft is provided with a sleeve which engages the outer end of the outer shaft so as, while permitting a swinging motion of the shafts with reference to each other, to prevent their longitudinal motion. This sleeve is carried in a vertically adjustable bearing, thus permitting adjustment of the angularity of the crushing members. One crushing plate is held upon the crushing member by bolts having tapered heads engaging a tapered surface upon the plate, the other by a centrally located screw, held against rotation by teeth engaging teeth upon a disk, which is held by lugs engaging a plurality of holes, and may be disconnected from the screw by a smaller screw carried in the screw, and engaging a lug on the disk. Thus the crushing plates, which are the wearing parts, are removably held in position. The crushing members are surrounded by a hood which catches the crushed material as it is thrown out, but the high speed at which the material travels necessitates frequent renewal of the surface upon which they impinge. This is provided for by having a ring in the plane of discharge, which may be readily removed. The ball and socket joint is oiled by a cup connected by a passageway through the inner shaft with the interior of the outer shaft along which oil travels to the bearings. The oil thus travels from one end of the outer shaft toward the other and thence into the ball and socket joint. Its tendency so to travel can be accelerated by a slight taper on the inside of the hollow shaft or any other convenient means.

In the modification I provide a means for pulverizing the material broken by the opposed plates wherein rolls rotating with such plates are held by centrifugal force against the pulverizing ring, the material which is fed by centrifugal force from the crusher, being ground or pulverized between the ring and rolls, means being provided at the bottom of the device whereby the pulverized material may leave the device. By this means I am enabled to provide a machine which will reduce material to a pulverized condition in which the pulverizing process takes place at all points along the periphery, the material to be pulverized is fed to the pulverizing members at all points along the periphery of the crushing ring, and means whereby the rate of feed may be nicely adjusted in order to prevent a clogging of the pulverizing means.

It will be understood, of course, that the structure which I have represented, while an operative device, is nevertheless capable of numerous modifications, and the forms, sizes, proportions and relations of the several parts are here described, illustrated and explained as what now appears to me to be the best means, though of course they can be greatly altered without departing from the spirit of my invention.

The means for oiling and distributing and controlling the oil and the means for securing the disk to the shaft and broadly the means for centrifugal feed to a ring roll structure are reserved for divisional applications.

I claim:

1. The combination of two shafts, one hollow and containing the other, with opposed crushing members mounted one on each shaft and rotating in the same direction, and a stop mounted on one shaft and bearing against the other for preventing the relative longitudinal motion of the shafts.

2. In a crushing machine the combination of two opposed crushing disk members with parts whereon they are mounted and whereby they are driven and an inclosing hood and a separate and removable ring therein and about the contiguous peripheries of the disks for the purpose of receiving the material discharged from between the disks.

3. The combination of two shafts, one hollow and containing the other, with opposed crushing members mounted one on each shaft, and a stop for preventing the relative longitudinal motion of the shafts, said stop containing a flange on the inner shaft which overlies the end of the outer shaft.

4. The combination of two shafts, one hollow and containing the other, with opposed crushing members mounted one on each shaft, and a stop for preventing the relative longitudinal motion of the shafts, said stop containing a flange on the inner shaft which overlies the end of the outer shaft, their engaging surfaces lying in the surface of a sphere.

5. The combination of two shafts, one hollow and containing the other, with opposed crushing members mounted one on each shaft, the shafts connected near the crushing members by a ball and socket bearing, and a stop mounted on one shaft and bearing against the other for preventing the relative longitudinal motion of the shafts.

6. The combination of two shafts, one hollow and containing the other, with opposed crushing members mounted one on each shaft, the shafts connected near the crushing members by a ball and socket bearing, and a stop for preventing the relative longitudinal motion of the shafts, said stop comprising engaging members on the shafts whose surfaces lie in the surface of a sphere concentric with the ball and socket bearing.

7. The combination of two shafts, one hollow and containing the other, with opposed crushing members mounted one on each shaft, and a stop mounted on one shaft and bearing against the other for preventing the relative longitudinal motion of the shafts, and a laterally adjustable bearing for the end of the inner shaft.

8. The combination of two shafts, one hollow and containing the other, with opposed crushing members mounted one on each shaft, a flanged sleeve on the inner shaft and a flange abutting the end of the outer shaft to serve as a stop to prevent the relative longitudinal motion of the shafts.

9. The combination of two shafts, one hollow and containing the other, with opposed crushing members mounted one on each shaft, a flanged sleeve on the inner shaft and a flange abutting the end of the outer shaft to serve as a stop to prevent the relative longitudinal motion of the shafts, and a laterally adjustable bearing for the sleeve.

10. The combination of two shafts, one hollow and containing the other, with opposed crushing members mounted one on each shaft, a flanged sleeve on the inner shaft and a flange abutting the end of the outer shaft to serve as a stop to prevent the relative longitudinal motion of the shafts, an oil groove in the back of such flange of a larger diameter than the sleeve, and holes therefrom to the bearing surface of the flange, and a bearing about the sleeve and approaching the flange so as to leave an oil passage through the bearing into the groove and thence through the holes to the bearing surface of the flange.

11. In a stone reducing machine the combination of two opposed rotating disk-like crushing members adapted to discharge by centrifugal force between their peripheries with a surrounding ring roll pulverizer comprising a ring and rolls which travel thereabout, the ring surrounding the peripheral discharge opening of the disk.

12. In a stone reducing machine the combination of two opposed rotating disk-like crushing members adapted to discharge by centrifugal force between their peripheries with a surrounding ring roll pulverizer comprising a ring and rolls which travel thereabout, the ring surrounding the peripheral discharge opening of the disk, and the rolls attached to and carried by the disk.

13. In a stone reducing machine the combination of two opposed rotating disk-like crushing members adapted to discharge by centrifugal force between their peripheries with a surrounding ring roll pulverizer comprising a ring and rolls which travel thereabout, the ring surrounding the peripheral discharge opening of the disk, and the rolls attached to and carried by the disk and free to be moved by centrifugal force toward the ring.

14. A crushing machine comprising a plurality of crushing disks mounted at an angle one to each other, the distance between said members increasing from their peripheries inwardly at all points therealong, with means for varying their angle of obliquity, a shaft for each of said disks, said varying means independent one of said shafts.

15. A crushing machine comprising two opposed rotating crushing members, shafts supporting them, a ball and socket joint interposed between said shafts, means for angularly adjusting one of said shafts with respect to the other, one of said shafts adapted to be rotated in response to the rotation of the other by the frictional engagement at the ball and socket joint and by frictional engagement between the crushing members and the material to be crushed between them.

16. In a crushing machine two disks adapted to rotate in the same direction and progressively recede from and approach each other at one point along their periphery, one of said disks having a dish-shaped surface and one of them provided with a feed aperture therethrough.

17. In a crushing machine comprising a plurality of shafts one within the other, a ball and socket connection between said shafts at one end, means for varying the angle between said shafts and means for preventing relative longitudinal movement of said shafts comprising fixed bearings for said outer shaft, a curved surface upon the end of said outer shaft, a sleeve slidably mounted upon said inner shaft, a flange upon said sleeve in opposition to the curved surface upon said inner shaft, for holding said flange against said inner surface and a bearing for said sleeve.

EDGAR B. SYMONS.

Witnesses:
GEORGE KLIPPEL,
GOLDA KLIPPEL.

Copies of this patent may be obtained for five cents each, by addressing the "Commissioner of Patents, Washington, D. C."